Aug. 7, 1945.    L. L. LUNDBERG    2,381,172
POTATO HARVESTING MACHINE
Filed Sept. 9, 1943    3 Sheets-Sheet 1
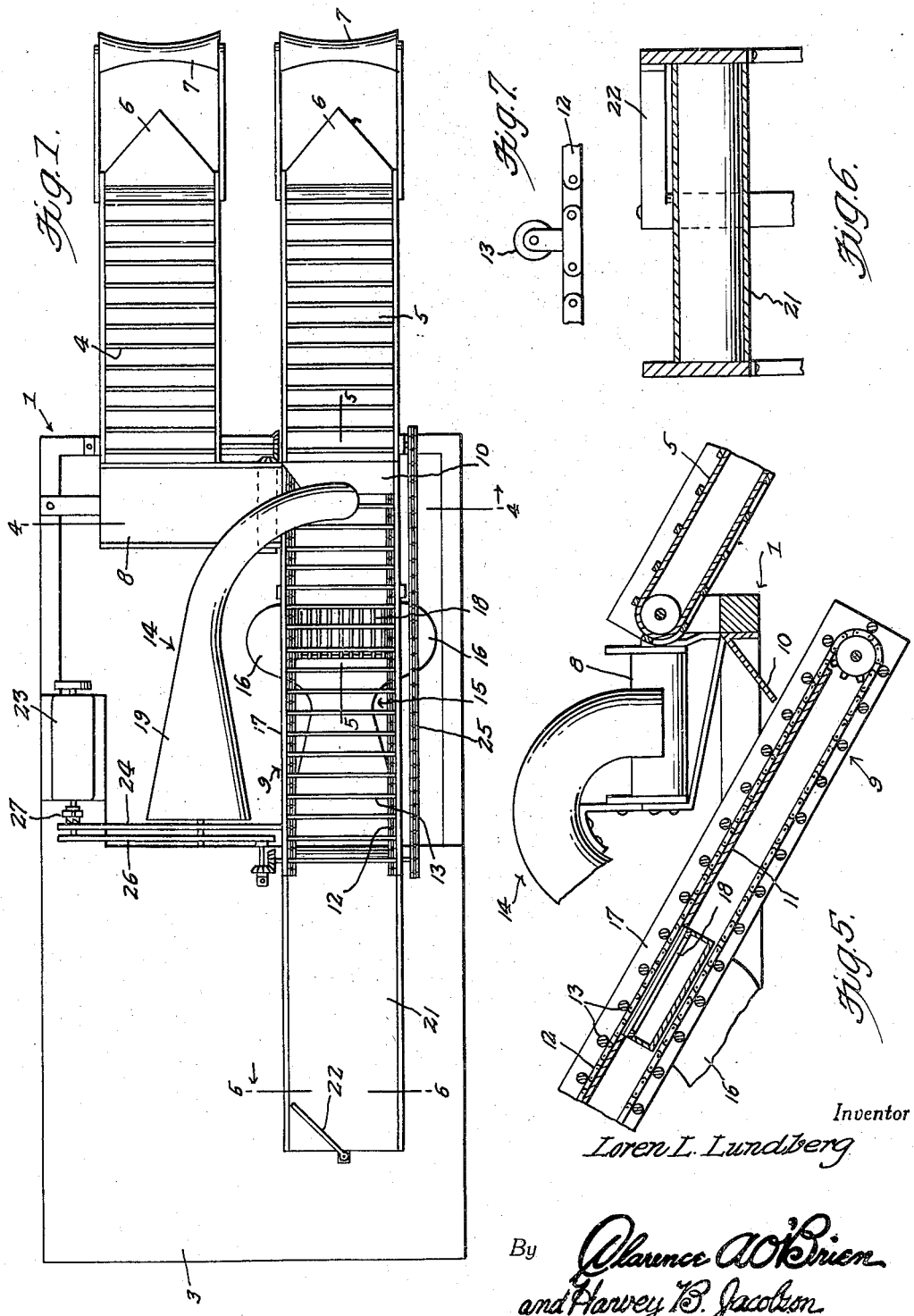
Inventor
Loren L. Lundberg
By Clarence A. O'Brien
and Harvey B. Jacobson
Attorneys

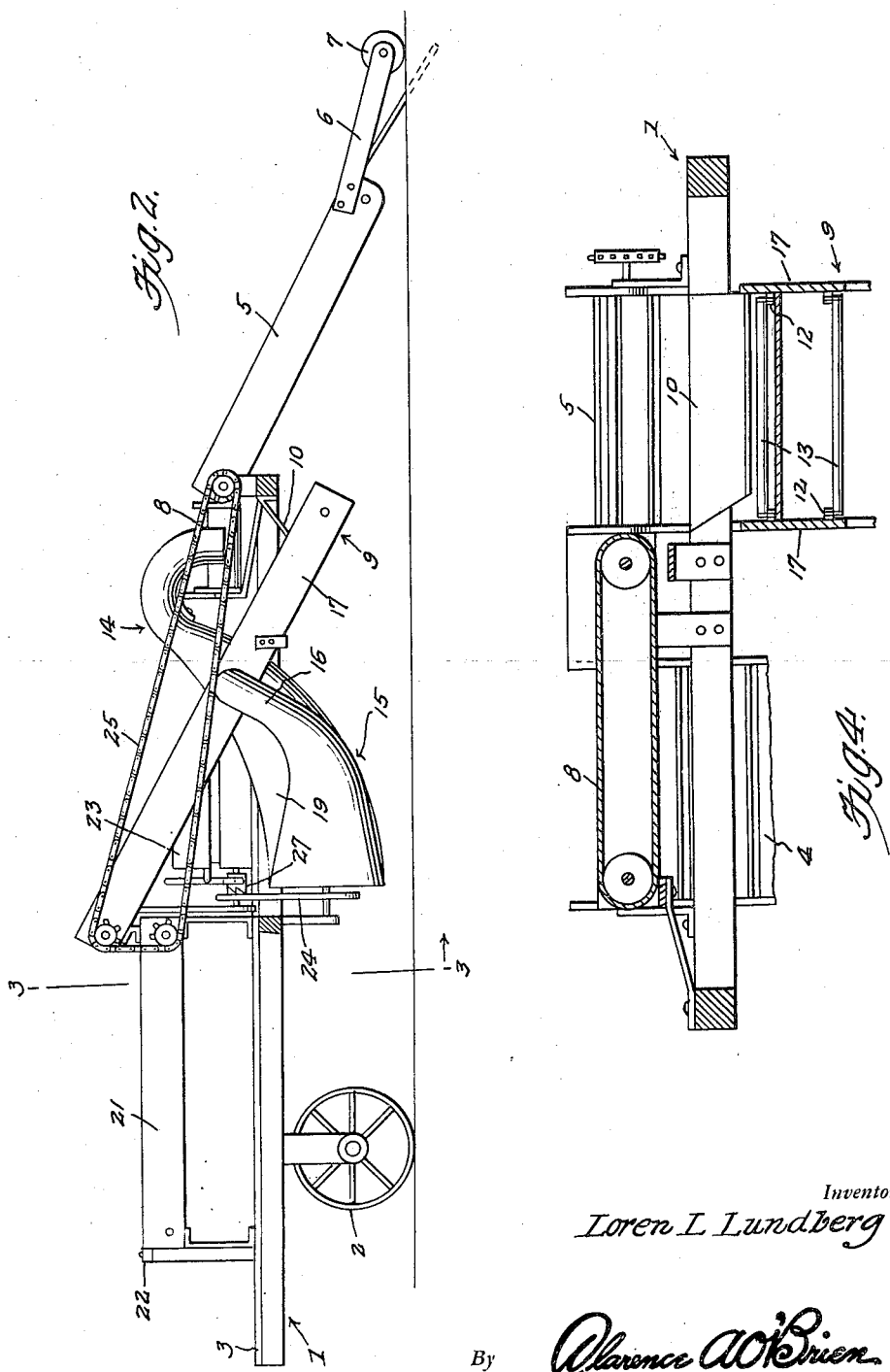

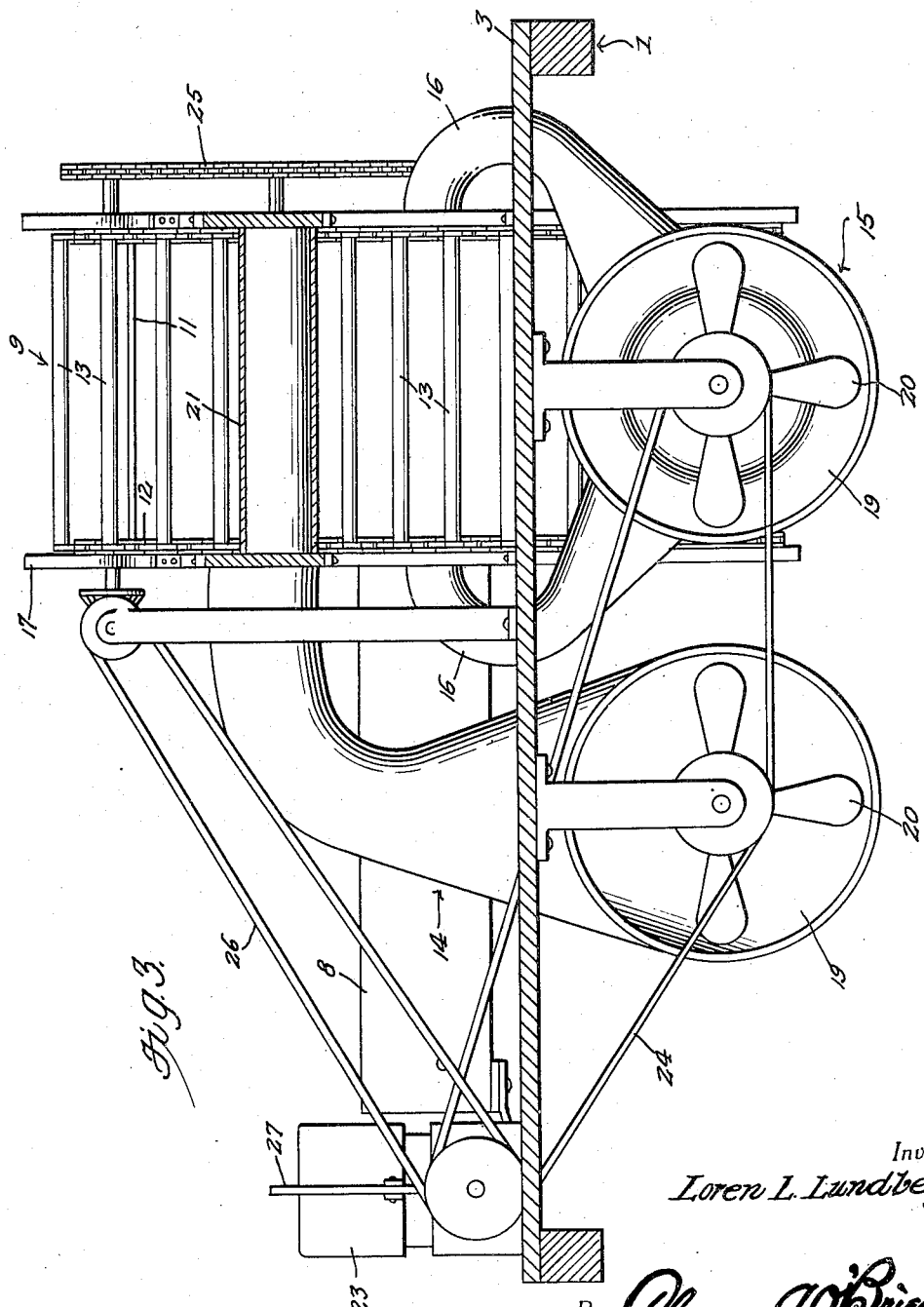

Patented Aug. 7, 1945

2,381,172

UNITED STATES PATENT OFFICE 2,381,172

POTATO HARVESTING MACHINE

Loren L. Lundberg, Pine Bluffs, Wyo.

Application September 9, 1943, Serial No. 501,691

1 Claim. (Cl. 55—51)

The present invention relates to new and useful improvements in potato harvesters, and has for its primary object to provide, in a manner as hereinafter set forth, a machine of this character comprising unique means for pneumatically separating from the potatoes the vines, trash, clods, dirt, etc.

Another very important object of the invention is to provide a potato harvesting machine of the aforementioned character wherein the elevating conveyors, aprons, cleaning mechanism, etc., are all driven from a single source of power.

Other objects of the invention are to provide a potato harvesting machine of the character described which will be comparatively simple in construction, strong, durable, highly efficient and reliable in operation, compact, and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 1 is a top plan view of a potato harvesting machine constructed in accordance with the present invention.

Figure 2 is a view in side elevation of the machine with a portion of the frame structure broken away in section.

Figure 3 is a cross sectional view through the machine, taken substantially on the line 3—3 of Figure 2.

Figure 4 is a cross sectional view through the upper portion of the machine, taken substantially on the line 4—4 of Figure 1.

Figure 5 is a fragmentary view in vertical longitudinal section through an intermediate portion of the machine, taken substantially on the line 5—5, of Figure 1.

Figure 6 is a cross sectional view through the sacking apron, taken substantially on the line 6—6 of Figure 1.

Figure 7 is a fragmentary view in side elevation, showing a portion of the main elevating conveyor.

Referring now to the drawings in detail, it will be seen that the embodiment of the invention which has been illustrated comprises an elongated frame structure of suitable dimensions and material which is designated generally by reference numeral 1. Supporting wheels 2 are provided beneath the rear portion of the frame structure 1. Mounted on the rear portion of the frame structure 1 is a platform 3. The machine may be hitched to a tractor or other source of power in any suitable manner.

The harvester is of the two-row type. Toward this end, spaced, parallel, inclined endless conveyors 4 and 5 extend forwardly and downwardly from the front end portion of the frame structure 1. Plows 6 on the forward ends of the conveyors 4 and 5 lift the potatoes out of the ground onto said conveyors. Ground rollers 7 of the shape shown to advantage in Figure 1 of the drawings are mounted on the conveyors 4 and 5 forwardly of the plows 6. The rollers 7 crush surface clods in addition to supporting the front end of the machine.

Mounted transversely on the front portion of the frame structure 1 is an apron 8 which receives the potatoes from the conveyor 4. The apron 8, also the conveyor 5, deposit the potatoes on the lower end portion of an elevating conveyor 9 which is mounted on the frame structure 1 adjacent one side thereof. A deflector or chute 10 on the frame structure 1 directs the potatoes onto the elevating conveyor 9 and partially breaks the fall thereof.

The elevating conveyor 9, in the embodiment shown, includes an inclined trough 11 in which the upper flights of a pair of endless chains 12 are operable. Transverse rollers 13 are journaled on the chains 12 for rolling the potatoes, etc. up the trough 11.

Suction conduits 14 and 15 are mounted on the forward portion of the frame structure 1. The suction conduit 14 extends downwardly toward the lower end of the elevating conveyor 9 and the intake end of said conduit is located adjacent the trough 11 for lifting all vines, trash, etc. therefrom.

The suction conduit 15 comprises branches 16 which enter the elevating conveyor 9 through the longitudinal sides 17 thereof for disintegrating and removing soft clots, trash, etc. through a grill 18 which is interposed in the trough 11. The conduits 14 and 15 further include substantially conical discharge end portions 19 which are directed rearwardly beneath the platform 3. Suction fans 20 are operable in the portions 19 of the conduits 14 and 15.

Mounted longitudinally above the platform 3 is an apron 21 which receives the potatoes from the elevating conveyor 9. The potatoes may be sacked at the rear end of the apron 21. Toward this end, a horizontally swinging gate 22 is operable across the rear end portion of the apron 21. The gate 22 is adapted to deflect the potatoes toward either side of the apron 21 at the rear or discharge end thereof, for causing said potatoes to drop into bags which may be held or supported in any suitable manner.

A suitable engine 23 drives the mechanism. As best seen in Figure 3 of the drawings, the suction fans 20 are actuated from the engine 23 through a belt and pulley drive 24. Means including a chain and sprocket drive 25 connects the elevating conveyor 9, the apron 21, the conveyors 5 and 4 and the apron 8 for operation in unison. A belt and pulley drive 26 operatively connect the elevating conveyor 9 to the engine 23. A suitable clutch 27 permits the drives 24 and 26 to be connected to or disconnected from the engine 23 as desired.

It is thought that the operation of the machine will be readily apparent from a consideration of the foregoing. Briefly, as the machine is pulled across the field, the rollers 7 which support the forward end of said machine, crush any surface clods in the paths of the plows 6. The plows 6 raise the potatoes out of the ground onto the conveyors 4 and 5. As hereinbefore stated, the conveyor 4 deposits the potatoes on the apron 8 and said apron 8, in turn, together with the conveyor 5, deposits the potatoes on the lower portion of the elevating conveyor 9. At this point the vines, trash, etc., are drawn off through the conduit 14 and discharged rearwardly beneath the platform 3. The potatoes are rolled up the elevating conveyor 9 across the grid 18 at which point the soft clods and other foreign matter are removed by the conduit 15 and also discharged rearwardly beneath the platform 3. From the elevating conveyor 9 the potatoes are discharged onto the longitudinal apron 21, at the rear end of which said potatoes are sacked. The sacked potatoes may then be loaded on a vehicle accompanying the machine. Inspectors may stand on the platform 3 on either or both sides of the apron 21. Also a supply of bags may be carried on the platform 3.

It is believed that the many advantages of a potato harvester constructed in accordance with the present invention will be readily understood, and although a preferred embodiment of the machine is as illustrated and described, it is to be understood that changes in the details of construction and in the combination and arrangement of parts may be resorted to which will fall within the scope of the invention as claimed.

What is claimed is:

A potato harvesting machine comprising a frame having rear supporting wheels, a pair of spaced parallel inclined endless conveyors extending forwardly and downwardly from the front end of said frame, plows on the forward ends of said conveyors, clod-crushing rollers mounted on the forward ends of the conveyors in front of said plows and supporting the front of the frame, an inclined elevating conveyor mounted longitudinally of and on the forward portion of the frame adjacent one side of the latter and aligned with one of said pair of conveyors to receive dirt and vines and potatoes from the same, a transverse apron mounted on the forward end of the frame and arranged to receive dirt and vines and potatoes from the other of said pair of conveyors and discharge the same onto the forward end of said elevating conveyor, means to separately remove dirt and vines from said elevating conveyor and discharge the same rearwardly onto the ground below the frame, a platform on the rear portion of the frame, and a longitudinal apron mounted above the platform in line with the elevating conveyor to receive the potatoes from the latter and convey the same rearwardly for bagging on the platform.

LOREN L. LUNDBERG.